US012354573B2

(12) United States Patent
Yamashita

(10) Patent No.: US 12,354,573 B2
(45) Date of Patent: Jul. 8, 2025

(54) WIND INSTRUMENT HAVING EXPANDED SOUND RANGE

(71) Applicant: Yoshifumi Yamashita, Yokohama (JP)

(72) Inventor: Yoshifumi Yamashita, Yokohama (JP)

(*) Notice: Subject to any disclaimer, the term of this patent is extended or adjusted under 35 U.S.C. 154(b) by 272 days.

(21) Appl. No.: 18/193,631

(22) Filed: Mar. 31, 2023

(65) Prior Publication Data

US 2023/0317035 A1 Oct. 5, 2023

(30) Foreign Application Priority Data

Apr. 2, 2022 (JP) ................................ 2022-062186
Jan. 24, 2023 (JP) ................................ 2023-009070

(51) Int. Cl.
*G10D 7/02* (2020.01)
*G10D 9/047* (2020.01)

(52) U.S. Cl.
CPC ............... *G10D 7/02* (2013.01); *G10D 9/047* (2020.02)

(58) Field of Classification Search
CPC ............ G10D 7/02; G10D 9/047; G10D 7/00; G10D 9/00
See application file for complete search history.

(56) References Cited

FOREIGN PATENT DOCUMENTS

| | | | | | |
|---|---|---|---|---|---|
| CN | 215933175 | U | | 3/2022 | |
| JP | 2003-323171 | A | | 11/2003 | |
| JP | 2005316419 | A | * | 11/2005 | .............. G10D 7/00 |
| JP | 3200582 | U | | 10/2015 | |
| JP | 3213653 | U | | 11/2017 | |
| JP | 3219026 | U | | 11/2018 | |

* cited by examiner

*Primary Examiner* — Kimberly R Lockett
(74) *Attorney, Agent, or Firm* — Yokoi & Co., U.S.A.; Toshiyuki Yokoi

(57) ABSTRACT

A predetermined sound interval interlocking mechanism 7 for making opening and closing operations of sound hole covers 4 of an existing sound range interlock with opening and closing operations of sound hole covers 4 of an expanded sound range is provided and a sound hole switching mechanism capable of collectively closing the sound holes of the high-pitched range by one key operation is provided independent from the predetermined sound interval interlocking mechanism 7. By using the above described mechanisms, both ranges can be played only by the operation of selecting the sound range and operating the sound hole covers 4 of the existing sound range. In addition, a slide plate 9 sliding along an inner surface of the tube for forcibly opening and closing the sound holes 3 from the inside of the tube is proposed as the sound hole switching mechanism.

3 Claims, 12 Drawing Sheets

WIND INSTRUMENT HAVING EXPANDED SOUND RANGE

CROSS-REFERENCE TO RELATED APPLICATIONS

This patent specification is based on Japanese patent application, No. 2022-062186 filed on Apr. 2, 2022 in the Japan Patent Office, and Japanese patent application, No. 2023-009070 filed on Jan. 24, 2023 in the Japan Patent Office, the entire contents of which are incorporated by reference herein.

PRIOR ART

[Patent Document 1] Japanese Utility Model Registration No. 3200582

BACKGROUND OF THE INVENTION

The present invention relates to a wind instrument having an expanded sound range. Mainly, the present invention relates to a key mechanism (i.e., interlocking mechanism) for controlling opening and closing operations of a plurality of sound holes of the wind instrument.

In a so-called wind instrument where a plurality of sound holes is arranged on a tube along a longitudinal direction of the tube and sound is generated by the standing wave generated between a mouthpiece and the sound holes in the tube, the width of the sound range constituted of fundamental standing wave, which is the standing wave without containing harmonic, is determined by the number of the sound holes located at the different distances from the mouthpiece. Here, the distance is not a linear distance but a distance along the longitudinal direction of the tube. In the wind instrument such as the recorder family having a window provided separately from the mouthpiece, the standing wave in the tube is generated between the window and the sound holes.

This fact means that the low-pitched range can be expanded by extending the length of the tube to add the sound holes on the expanded portion while the high-pitched range can be expanded by adding the sound holes at the position nearer to the mouthpiece than the existing sound holes without changing the length of the tube in the wind instrument. However, it is impossible to unlimitedly increase the number of the sound holes. Since the number of fingers of both hands is ten, even if a plurality of sound holes is opened and closed by each finger, the number of the sound holes capable of being opened and closed practically is limited. In many wind instruments, the number of the sound holes corresponds to an octave (i.e., approximately twelve) in the Western scale. The sound generation exceeding the above descried sound range depends on the harmonic standing wave without depending on the fundamental standing wave.

Patent Document 1 shows an example of a flute where the tube of the foot is extended and sound holes and sound hole covers are added to expand the sound range. Although the lowest tone is C in the standard flute, the flute having an extended tube is widely used for generating the tone of B in English scale or H in German scale, which is a halftone lower than C. The flute shown in Patent Document 1 can further generate the tone of B-flat in English scale or B in German scale, which is further a halftone lower than the above described tone. In order to achieve the above described configuration, an operation lever for opening and closing the added sound hole covers is newly added in the above described flute.

SUMMARY OF THE INVENTION

When focused on the opening and closing operations of the sound hole covers in the wind instrument of Patent Document 1, it is necessary for a player to operate five keys by one finger (i.e., the little finger of the right hand). In the wind instrument which requires the above described fingering, it is difficult to play a rapid passage in the expanded sound range. In addition, new operation keys should be further added as the sound range is further expanded in the above described method. Namely, it becomes more difficult to play the rapid passage. Accordingly, the expandable sound range is limited in the above described method considering the possibility of practical performance.

The present invention provides a wind instrument having a significantly expanded playable sound range and capable of playing a rapid passage in the expanded sound range by the existing operation keys without adding new operation keys for the expanded sound range.

A wind instrument of the present invention includes: a tube 1; a mouthpiece 2 provided on the tube 1; a plurality of sound holes 3 provided on the tube 1; sound hole covers 4, each of the sound hole covers 4 being configured to open and close each of the sound holes 3; a plurality of predetermined sound interval interlocking mechanisms 7, each of the predetermined sound interval interlocking mechanism 7 being configured to make opening and closing operations of one of two sound hole covers for generating two tones having a predetermined sound interval interlock with the other of the two sound hole covers; a high-pitched sound hole assembly 5 which is an assembly of the sound holes located at a higher-pitched range in the sound holes opened and closed while being interlocked by the predetermined sound interval interlocking mechanism 7; a low-pitched sound hole assembly 6 which is an assembly of the sound holes located at a lower-pitched range in the sound holes opened and closed while being interlocked by the predetermined sound interval interlocking mechanism 7; and a sound hole switching mechanism configured to collectively stop generating sound from the sound holes of all of the high-pitched sound hole assembly 5 by one key operation without depending on a state of an interlocking operation of the sound hole covers and without affecting the opening and closing operations of the sound hole covers of the low-pitched sound hole assembly 6, the operation of the sound hole switching mechanism being given priority over the interlocking operation of the sound hole covers operated by the predetermined sound interval interlocking mechanism 7.

Furthermore, in the wind instrument of the present invention, a slide plate 9 is provided as the sound hole switching mechanism, and the slide plate 9 is configured to slide along an inner surface of the tube 1 in a circumferential direction, slide along the inner surface of the tube 1 in a longitudinal direction, slide along the inner surface of the tube 1 in a spiral direction, or slide inside the tube 1 in a radial direction. Furthermore, in the wind instrument of the present invention, a channel switching mechanism 12 is provided as the sound hole switching mechanism, the tube 1 includes a main tube 10, a high-pitch branch tube 11 branched from the main tube 10 and a low-pitch branch tube 36 branched from the main tube 10, the sound holes of the high-pitched sound hole assembly 5 are arranged on the high-pitch branch tube 11, the sound holes of the low-pitched sound hole assembly 6 are arranged on the low-pitch branch tube 36, the channel switching mechanism 12 is arranged on a position where the main tube 10 is branched to the high-pitch branch tube 11 and the low-pitch branch tube 36, and the channel switching mechanism 12 is configured to switch a passage of breath entered from the main tube 10 between the high-pitch branch tube 11 and the low-pitch branch tube 36.

In the wind instrument of the present invention, the playable sound range can be expanded significantly and the expanded sound range can be played by the existing operation keys without adding new operation keys for the expanded sound range. Accordingly, it is not required to move one finger between different operation keys when the expanded sound range is played. Thus, it is possible to play the wind instrument at a rapid tempo.

DETAILED DESCRIPTION OF THE INVENTION

In order to expand the sound range of the wind instrument significantly, it is possible to add a large number of sound holes in the direction of expanding the sound range as described above. However, the problem is how the added sound holes are opened and closed. The present invention discloses the wind instrument capable of opening and closing the sound hole covers of the added sound holes by the operation of opening and closing the existing (conventionally existing) sound hole covers of the existing sound holes located at the existing sound range. The predetermined sound interval interlocking mechanism of the present invention is the interlocking mechanism for mechanically or electromagnetically connecting the sound hole cover of the existing sound range and the sound hole cover of the expanded sound range so that the sound hole cover of the expanded sound range is opened and closed by the opening and closing operation of the sound hole cover of the existing sound range. A player using the wind instrument of the present invention can play both the existing sound range and the expanded sound range by the opening and closing operation of the sound hole covers of the existing sound range.

Hereafter, the embodiments of the present invention will be explained based on the drawings.

Figure 1A:
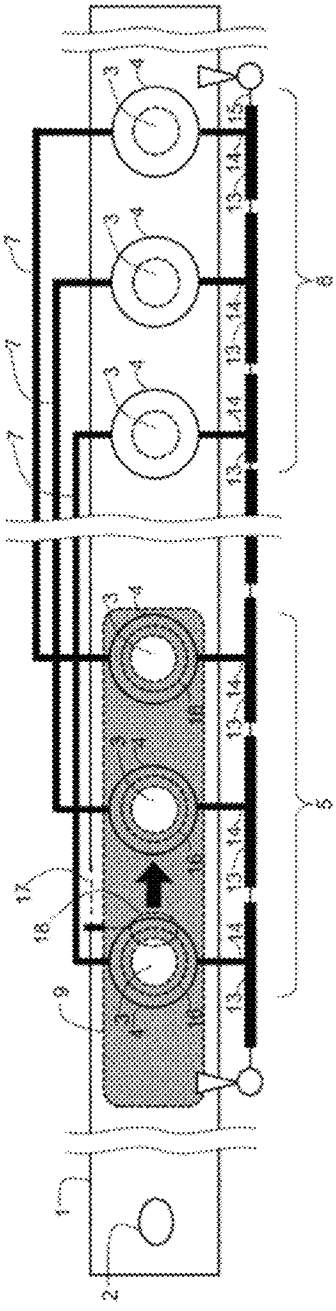
FIGS. 1A to 1C are schematic plan views and a schematic cross-sectional view of a wind instrument of the present invention.
Figure 1B:
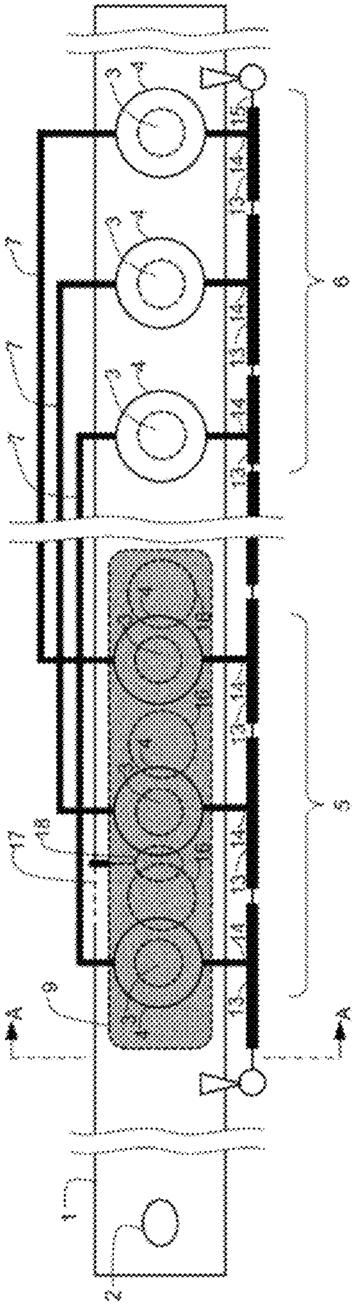
Figure 1C:
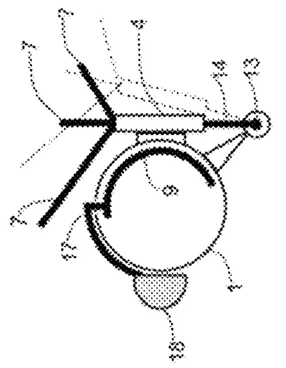

FIGS. 1A to 1C show the wind instrument of the present invention. FIGS. 1A to 1C show schematic views of the wind instrument where a slide plate 9 slides in the longitudinal direction of the tube 1 in the tube 1. The wind instrument of the present invention includes a tube 1; a mouthpiece 2 provided on the tube 1; a plurality of sound holes 3 provided on the tube 1; and sound hole covers 4, each of the sound hole covers 4 being configured to open and close each of the sound holes 3. In the wind instrument of FIGS. 1A to 1C, the sound range is expanded toward the low-pitched range. FIG. 1A shows the state before the slide plate 9 slides, while FIG. 1B shows the state after the slide plate 9 slides. FIG. 1C is a cross-sectional view of the wind instrument cut along A-A line of FIG. 1B.

In the components shown in FIGS. 1A to 1C, the interlocking mechanisms for interlocking the sound hole covers achieved by the conventional technology will be explained first. The interlocking mechanisms are provided by sound hole cover interlocking cylinders 13, sound hole cover connecting arms 14 and a sound hole cover rotating shaft 15. Each of the sound holes 3 is opened or closed by pressing each of the sound hole covers 4 arranged above each of the sound holes 3 by the finger or releasing the finger from each of the sound hole covers 4. Each of the sound hole covers 4 is connected to the sound hole cover interlocking cylinder 13 provided independently for each the sound hole covers 4 via each of the sound hole cover connecting arms 14. These components are integrally rotated around the sound hole cover rotating shaft 15 to open and close each of the sound holes 3.

In order to make the opening and closing operations integrate with each other between the neighboring sound hole covers 4, the sound hole cover connecting arms 14 are connected to the common sound hole cover interlocking cylinder 13. In order to make the opening and closing operations integrate with each other between the remote sound hole covers 4, the sound hole cover interlocking cylinders 13 and the common sound hole cover rotating shaft 15 are connected to each other by a pin penetrating in a radial direction or connected to each other by using a connector having a bridge shape. Alternatively, protrusions protruded from each of the sound hole cover interlocking cylinders 13 are contacted to transmit the rotational force in one direction, for example. The above described method of making the neighboring or remote sound hole covers 4 interlock with each other is developed by Theobald Böhm, an inventor in Germany, in 19th century. After that, this method is conventionally and widely used in the woodwind instruments (including the flute).

The above described explanation is related to the conventional technology. Compared to the above described wind instruments, the wind instrument shown in FIG. 1 of the present invention includes a predetermined sound interval interlocking mechanism 7 for making the opening and closing operation of each of the sound hole covers 4 of the high-pitched sound hole assembly 5 controlling the existing sound range, which is the not expanded sound range, interlock with the opening and closing operation of each of the sound hole covers 4 of the low-pitched sound hole assembly 6 controlling the expanded sound range. Namely, the wind instrument of the present invention includes a plurality of predetermined sound interval interlocking mechanisms 7, each of the predetermined sound interval interlocking mechanism 7 being configured to make opening and closing operations of one of two sound hole covers for generating two tones having a predetermined sound interval interlock with the other of the two sound hole covers. The high-pitched sound hole assembly 5 is an assembly of the sound holes located at a higher-pitched range in the sound holes opened and closed while being interlocked by the predetermined sound interval interlocking mechanisms 7. The low-pitched sound hole assembly 6 is an assembly of the sound holes located at a lower-pitched range in the sound holes opened and closed while being interlocked by the predetermined sound interval interlocking mechanisms 7. By using the predetermined sound interval interlocking mechanisms 7, a player can operate the opening and closing operations of the sound hole covers 4 for the existing sound range and the opening and closing operation of the sound hole covers 4 for the expanded sound range only by the operation of the former sound hole covers 4.

However, even if the high-pitched range can be played, the low-pitched range cannot be played only by the above described predetermined sound interval interlocking mechanisms 7. This is because the fundamental standing wave in the tube is generated between the mouthpiece 2 or a window 34 and the opened sound hole 3 nearer to the mouthpiece 2 or the window 34. Namely, when the low-pitched range is played, if at least one of the sound holes 3 is in an open state in the high-pitched sound hole assembly 5 by the interlocking operation of the predetermined sound interval interlocking mechanisms 7, the sound of the high-pitched range is generated from the opened sound hole 3 against the intension of the player. This fact teaches that it is necessary to prevent the above described sound hole 3 from generating the sound when the low-pitched range is played, for example, by closing the above described sound hole 3 or blocking the breath not to reach the above described sound hole 3 using the other means than the predetermined sound interval interlocking mechanisms 7 even if the interlocking operation for opening and closing the sound hole covers 4 of the high-pitched sound hole assembly 5 operated by the predetermined sound interval interlocking mechanisms 7 is in a state of opening the above described sound hole 3. In order to achieve the above described mechanism, the wind instrument of the present invention includes a sound hole switching mechanism configured to collectively stop generating sound from the sound holes 3 of all of the high-pitched sound hole assembly 5 by one key operation without depending on a state of an interlocking operation of the sound hole covers and without affecting the opening and closing operations of the sound hole covers of the low-pitched sound hole assembly 6, the operation of the sound hole switching mechanism being given priority over the interlocking operation of the sound hole covers operated by the predetermined sound interval interlocking mechanisms 7. Namely, the above described sound hole switching mechanism is the mechanism for collectively preventing the sound holes of all of the high-pitched sound hole assembly 5 from generating sound by one key operation without affecting the opening and closing operations of the sound hole covers of the low-pitched sound hole assembly 6 even when the predetermined sound interval interlocking mechanism 7 is in the operation state of opening a part or a whole of the sound hole covers 4 of the high-pitched sound hole assembly 5. In the wind instrument shown in FIGS. 1A to 1C, the slide plate 9 corresponds to the sound hole switching mechanism. When the player plays the high-pitched range (i.e., the existing sound range), the slide plate 9 is arranged at the position of FIG. 1A to open the sound holes 3 of the high-pitched sound hole assembly 5. When the player plays the low-pitched range (i.e., the expanded sound range), the slide plate 9 is arranged at the position of FIG. 1B to close the sound holes 3. Thus, all sound ranges can be played only by the opening and closing operation of the sound hole covers 4 of the high-pitched sound hole assembly 5.

The slide plate 9 is arranged inside the tube 1 and slid along an inner surface of the tube 1 so that the opening and closing states of the sound holes 3 can be changed from the inside of the tube 1. The combination pattern of the opening and closing states of the sound holes 3 varies depending on the shape of the slide plate 9, the shape of each of the sound holes 3 and the relative positional relationship of the sound holes 3 and the slide plate 9. For example, three slide plate through holes 16 are provided in the slide plate 9 as shown in FIGS. 1A and 1B. As shown in FIG. 1A, when the slide plate 9 is located at the position where the three slide plate through holes 16 are overlapped with three sound holes 3 of the high-pitched sound hole assembly 5, the three sound holes 3 are opened. On the other hand, as shown in FIG. 1B, when the slide plate 9 is located at the position where the three slide plate through holes 16 are not overlapped with three sound holes 3, the sound holes 3 are closed.

FIG. 1C is a cross-sectional view cut along A-A line of FIG. 1B. The slide plate 9 is integrated with a slide plate operation key 18 through a slit hole 17 having a slit shape formed on the tube 1. A player operates to slide the slide plate 9 in the longitudinal direction of the tube 1 using the slide plate operation key 18 from the outside of the tube 1. Consequently, the three sound holes 3 of the high-pitched sound hole assembly 5 shown in FIG. 1A and FIG. 1B can be integrally and simultaneously opened and closed. Note that three predetermined sound interval interlocking mechanisms 7 are radially arranged from the sound hole cover 4 in FIG. 1C for preventing the predetermined sound interval interlocking mechanisms 7 from interfering with each other.

Figure 2:
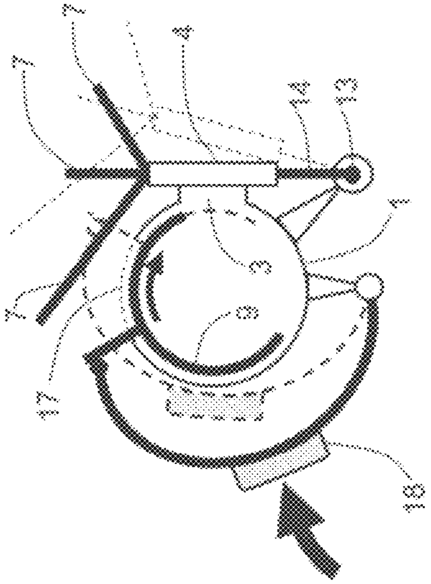
FIG. 2 is a schematic cross-sectional view of the wind instrument of the present invention adopting a slide plate sliding in a circumferential direction.

FIG. 2 is a schematic cross-sectional view of the wind instrument adopting the slide plate 9 sliding in a circumferential direction. In the above described wind instrument, when the slide plate operation key 18 is pressed down, the protrusion connected with the slide plate 9 through the slit hole 17 is pressed in the circumferential direction. Consequently, the slide plate 9 slides in the circumferential direction inside the tube 1. In FIG. 2, the thick solid line shows the position before the slide plate 9 slides, while the broken line shows the position after the slide plate 9 slides. The sound holes 3 are opened at the position of the thick solid line. On the other hand, the sound holes 3 are closed by the slide plate 9 from the inside of the tube 1 at the positon of the broken line.

The slide plate 9 is not limited to the slide plate shown in FIGS. 1A to 1C sliding in the longitudinal direction and the slide plate shown in FIG. 2 sliding in the circumferential direction. When the movable range of sliding is limited, it is also possible to use the slide plate 9 sliding in a spiral direction. Furthermore, it is also possible to use the slide plate 9 sliding in a radial direction inside the tube. Namely, the slide plate 9 is in contact with the inner wall of the tube when closing the sound holes 3 while the slide plate 9 is separated from the inner wall when opening the sound holes 3.

In addition, the slide plate 9 is not limited to the slide plates shown in FIGS. 1A to 1C and FIG. 2 where only all of the sound holes 3 included in the high-pitched sound hole assembly 5 are integrally closed or opened. It is also possible to configure the slide plate 9 to close not only all of the sound holes of the high-pitched sound hole assembly 5 but also a part of the sound holes 3 not included in the high-pitched sound hole assembly 5 simultaneously by moving the slide plate 9. It is also possible to configure the slide plate 9 to transfer a part of the sound holes 3 not included in the high-pitched sound hole assembly 5 from the open state to the closed state and to transfer the other sound holes 3 from the closed state to the open state by moving the slide plate 9. Furthermore, the number of the positions where the slide plate 9 is stopped is not limited to two. It is also possible to configure the slide plate 9 to stop at three or more positions so that the combination pattern of the opening and closing states of the sound holes 3 vary depending on the stopping positions.

Figure 3A:
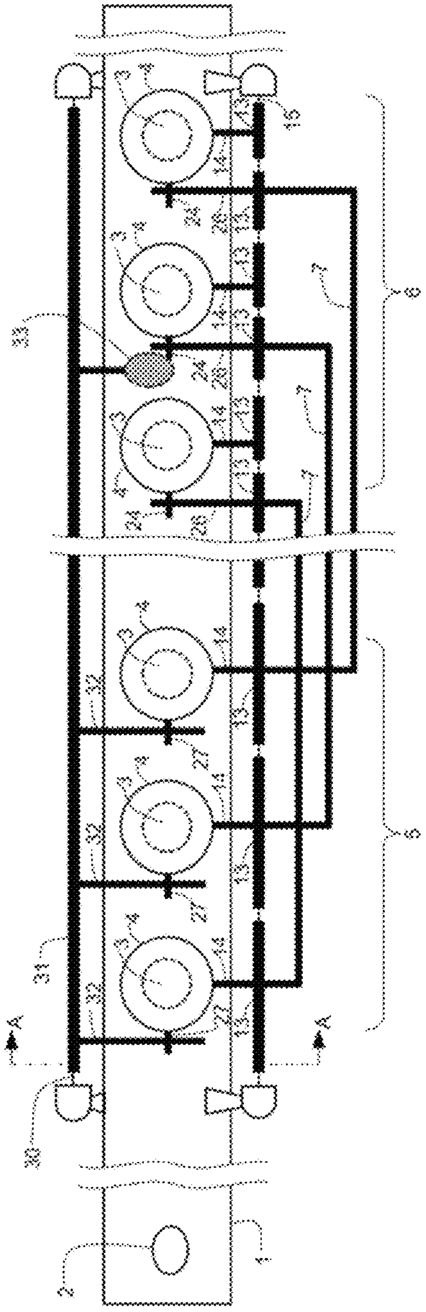
FIGS. 3A and 3B are a schematic plan view and a cross-sectional view of the wind instrument where the high-pitched range is expanded using the sound hole switching mechanism other than the slide plate.
Figure 3B:
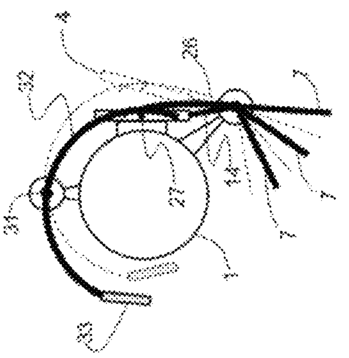

FIGS. 3A and 3B are schematic views of the wind instrument where the high-pitched range is expanded using an integrally closing mechanism other than the slide plate 9 as the sound hole switching mechanism. FIG. 3A is a schematic plan view. In FIG. 3A, the integrally closing mechanism is provided by a rotating body formed by integrating: a high-pitch range connector cylinder 31 configured to rotate around a high-pitch range connector rotation axis 30; a high-pitch range connector arm 32 extended from the high-pitch range connector cylinder 31 toward the sound hole covers 4; and a high-pitch range connector operation key 33.

FIG. 3B is a cross-sectional view cut along A-A line of FIG. 3A. In FIG. 3B, the thick solid line shows the state where the high-pitch range connector operation key 33 is separated above, while the broken line shows the state where the high-pitch range connector operation key 33 is pressed down. A press receiving projection 27 is a rod-shaped protrusion integrated with the sound hole covers 4 of the high-pitched sound hole assembly 5 and is arranged below the high-pitch range connector arm 32. When the player presses down or lifts up the high-pitch range connector operation key 33, the above described rotating body is rotated and the high-pitch range connector arm 32 separates from the press receiving projection 27 or presses down the press receiving projection 27. Thus, the three sound hole covers 4 of the high-pitched sound hole assembly 5 are integrally opened or closed.

In the wind instrument shown in FIGS. 3A and 3B, each of the predetermined sound interval interlocking mechanisms 7 for interlocking the sound hole covers 4 of the high-pitched sound hole assembly 5 and the sound hole covers 4 of the low-pitched sound hole assembly 6 is a bridge-shaped coupling body connecting the sound hole cover interlocking cylinders 13 different from the predetermined sound interval interlocking mechanisms 7 shown in FIGS. 1A to 1C connecting the sound hole covers 4 directly. A pressing protrusion 24 is a rod-shaped protrusion integrated with each of the sound hole covers 4 of the low-pitched sound hole assembly 6. A predetermined sound interval interlocking mechanism arm 26 is an arm integrated with the sound hole cover interlocking cylinder 13 and extended toward the lower part of the pressing protrusion 24. When the sound hole covers 4 of the low-pitched sound hole assembly 6 are opened and closed, the pressing protrusion 24 presses down the predetermined sound interval interlocking mechanism arm 26 or separates from the predetermined sound interval interlocking mechanism arm 26 and the sound hole cover interlocking cylinder 13 is rotated. Thus, the distant sound hole covers 4 of the high-pitched sound hole assembly 5 are opened and closed via the predetermined sound interval interlocking mechanism 7.

Figure 4A:
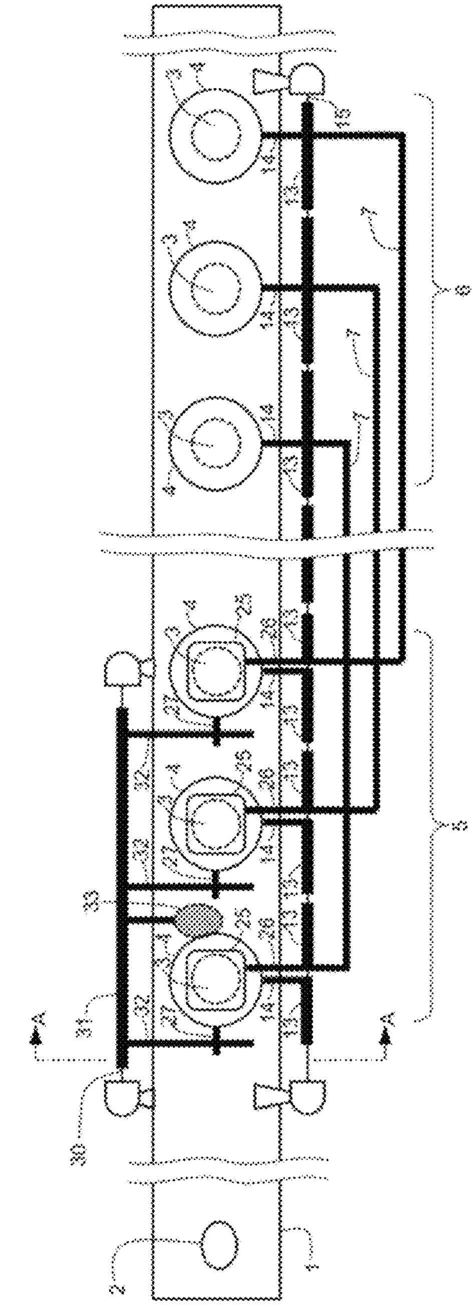
FIGS. 4A and 4B are a schematic plan view and a cross-sectional view of the wind instrument where the low-pitched range is expanded using the sound hole switching mechanism other than the slide plate.
Figure 4B:
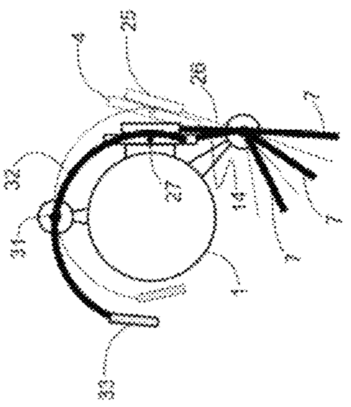

FIGS. 4A and 4B are also schematic views of the wind instrument using the integrally closing mechanism as the sound hole switching mechanism same as that of FIGS. 3A and 3B. In the wind instrument shown in FIGS. 4A and 4B, the sound range is expanded toward the low-pitched range. In the above described wind instrument, sound hole cover pressing keys 25 are arranged directly above the sound hole covers 4 of the high-pitched sound hole assembly 5, which is the existing sound range. Each of the sound hole cover pressing keys 25 is connected to each of the sound hole cover interlocking cylinders 13 and further connected with each of the sound hole covers 4 of the low-pitched sound hole assembly 6, which is the expanded sound range, via the predetermined sound interval interlocking mechanism 7. When the player presses down or lifts up the sound hole cover pressing key 25, the sound hole cover 4 of the high-pitched sound hole assembly 5 arranged directly below and located at the existing sound range is opened and closed. Simultaneously, the sound hole cover 4 of the low-pitched sound hole assembly 6, which is the expanded sound range and connected by the predetermined sound interval interlocking mechanism 7, is opened and closed.

FIG. 4B is a cross-sectional view of the wind instrument cut along A-A line of FIG. 4A. In FIG. 4B, the thick solid line shows the state where the high-pitch range connector operation key 33 is separated above. In the above described state, the press receiving projection 27 is pressed down by the high-pitch range connector arm 32 and thus the sound hole cover 4 of the high-pitched sound hole assembly 5 is in the closed state. In the above described state, only the sound hole cover 4 of the expanded sound range is opened and closed by the operation of lifting up and pressing down the sound hole cover pressing key 25. Thus, the sound hole cover 4 of the high-pitched sound hole assembly 5, which is the existing sound range, keeps the closed state.

In FIG. 4B, the broken line shows the state where the high-pitch range connector operation key 33 is pressed down. In the above described state, the high-pitch range connector arm 32 is separated upward from the press receiving projection 27. Consequently, the sound hole cover 4 of the high-pitched sound hole assembly 5 is in the open state. In the above described state, the sound hole cover 4 located directly below is opened and closed by the operation of lifting up and pressing down the sound hole cover pressing key 25. Simultaneously, the sound hole cover 4 of the expanded sound range connected by the predetermined sound interval interlocking mechanism 7 is interlockingly opened and closed.

Figure 5A:
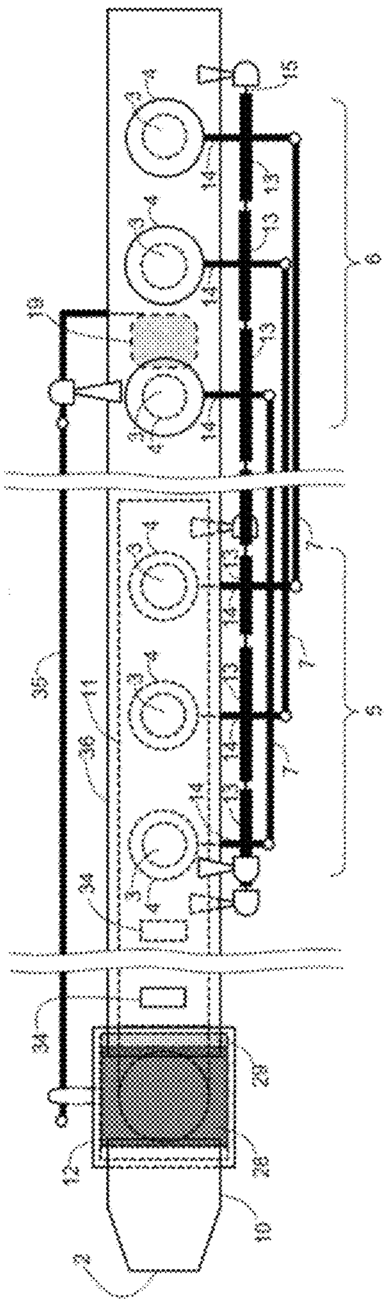
FIGS. 5A to 5C are a schematic plan view, a schematic front view and a schematic cross-sectional view of the wind instrument concerning claim 3 of the present invention.
Figure 5B:
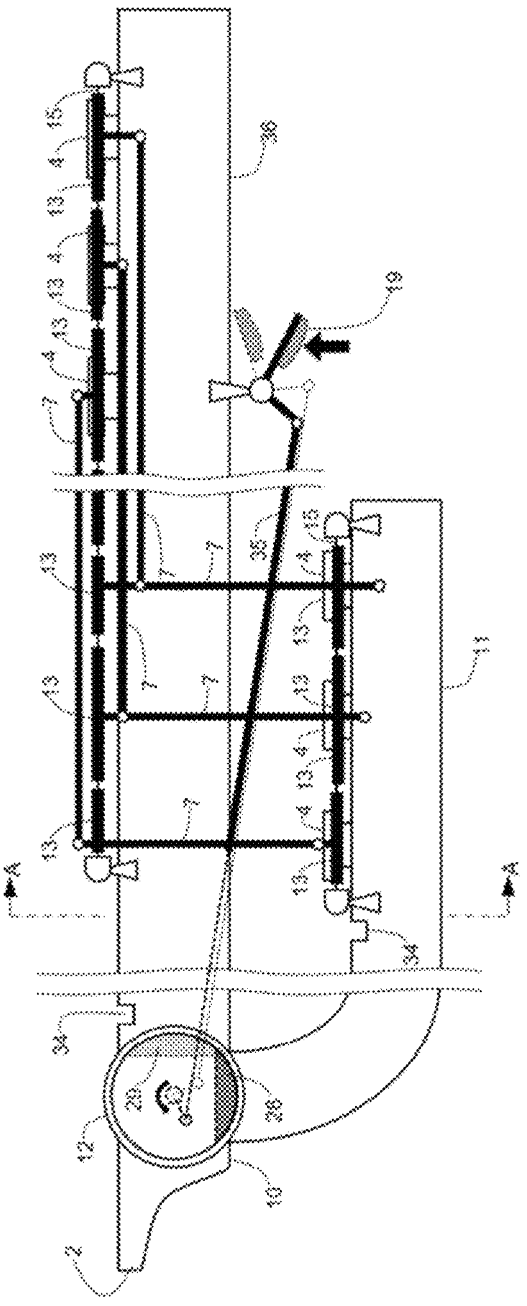
Figure 5C:
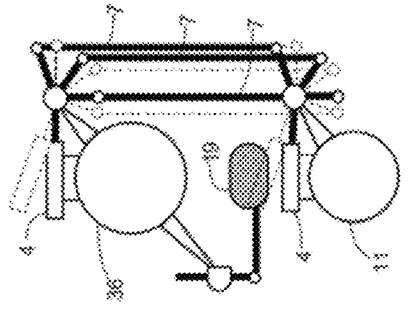

FIGS. 5A to 5C relate to the wind instrument of claim 3 of the present invention and show the schematic views of a recorder where the sound range is expanded toward the high-pitched range. FIG. 5A is a plan view, FIG. 5B is a front view and FIG. 5C is a cross-sectional view cut along A-A line of FIG. 5B. The above described recorder has a plurality of passages into which the breath entered from the main tube 10 having the mouthpiece 2. The above described recorder also has a channel switching mechanism 12 for selecting and changing the passages during playing. In the above described recorder, the low-pitched sound hole assembly 6, which is the existing sound range, is arranged on the low-pitch branch tube 36 having a relatively long passage, and the high-pitched sound hole assembly 5, which is the expanded sound range, is arranged on the high-pitch branch tube 11 having a relatively short passage, and the sound hole covers 4 of them are connected by the predetermined sound interval interlocking mechanism 7. Namely, the recorder shown in FIGS. 5A to 5C includes the main tube 10, the high-pitch branch tube 11 branched from the main tube 10 and the low-pitch branch tube 36 branched from the main tube 10 instead of the tube 1 shown in FIG. 1A to 4B. The channel switching mechanism 12 is configured to switch a passage of breath entered from the main tube 10 between the high-pitch branch tube 11 and the low-pitch branch tube 36.

In the above described recorder, a three-way valve is adopted as the channel switching mechanism 12 arranged on the position where the main tube 10 is branched to the high-pitch branch tube 11 and the low-pitch branch tube 36. The three-way valve corresponds to a sound hole switching mechanism. The three-way valve is connected with a channel switching key 19 by a channel switching link mechanism 35. When the channel switching key 19 is pressed down or lifted up, the three-way valve is rotated via the channel switching link mechanism 35 and the tube flowing the air entered from the mouthpiece 2 is switched. Thus, the tube generating the standing wave is changed. In FIG. 5A and FIG. 5B, the dark-shaded portion 28 of the channel switching mechanism 12 indicates a state that a passage intercepting wall inside the three-way valve is located at the positon for shutting off the high-pitch branch tube 11. The light-shaded portion 29 indicates a state that the passage intercepting wall inside the three-way valve is located at the positon for shutting off the low-pitch branch tube 36. Although the windows 34 are provided on each of the passages in the above described recorder, it is also possible to arrange the window 34 common for both passages between the mouthpiece 2 and the channel switching mechanism 12.

Figure 6A:
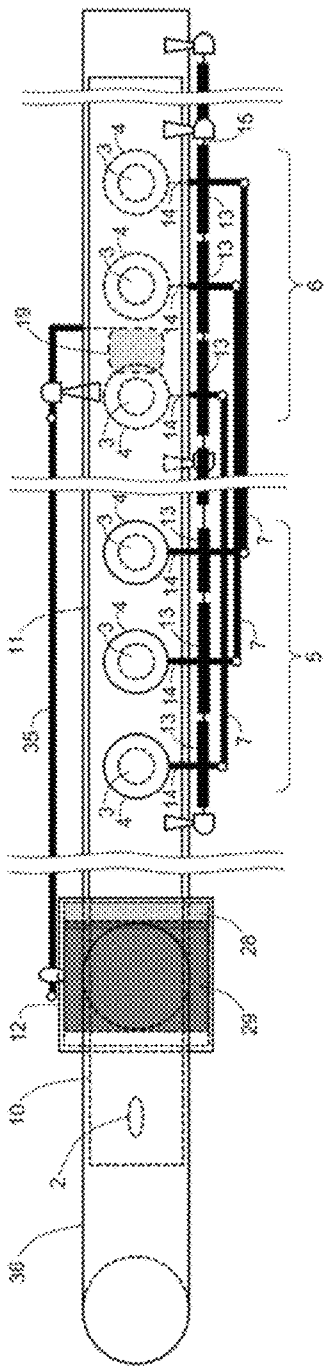
FIGS. 6A to 6C are a schematic plan view, a schematic front view and a schematic cross-sectional view of the wind instrument concerning claim 3 of the present invention.
Figure 6B:
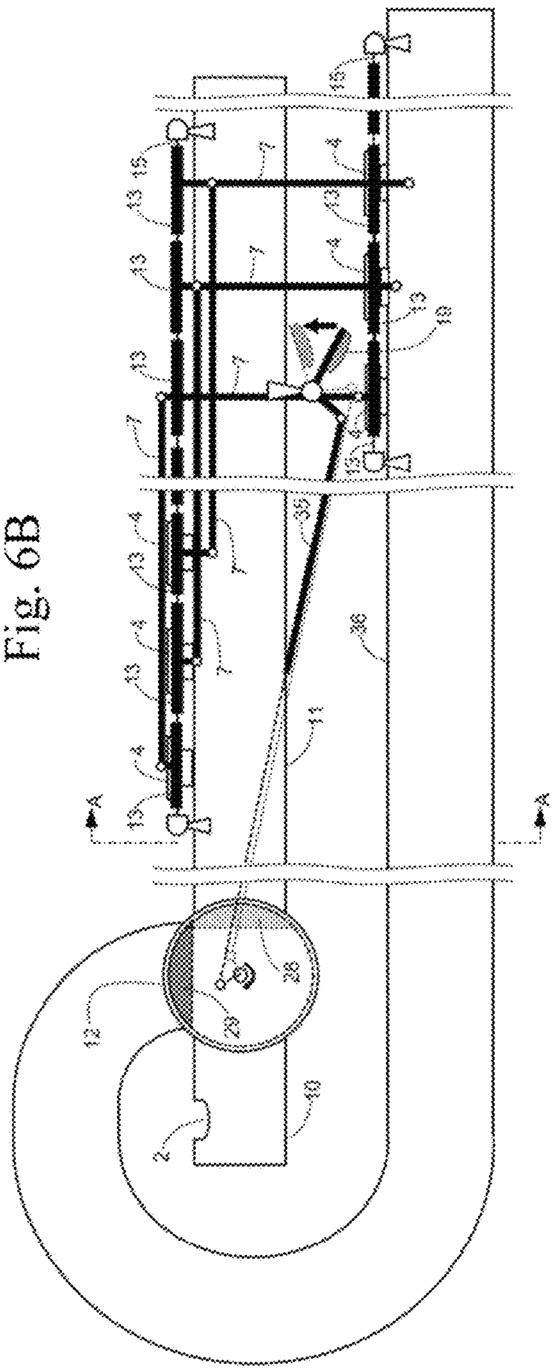
Figure 6C:
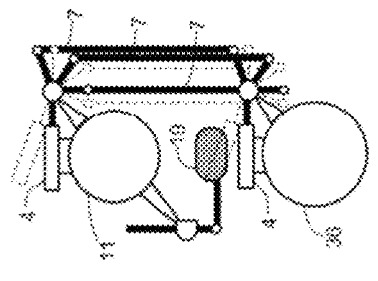

FIGS. 6A to 6C are also the schematic views of the wind instrument of claim 3 of the present invention. FIG. 6A is a plan view, FIG. 6B is a front view and FIG. 6C is a cross-sectional view cut along A-A line of FIG. 6B. The wind instrument shown here is a transverse whistle represented by the flute where the sound range is expanded toward the low-pitched range. The operation of each component is same as the example of the recorder shown in FIGS. 5A to 5C.

Figure 7:
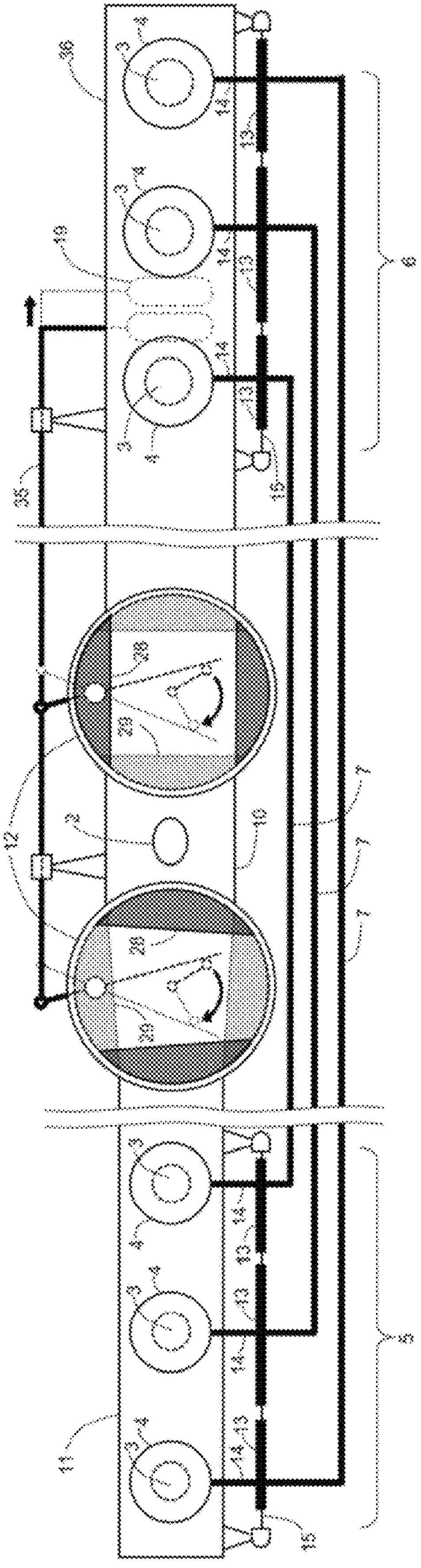
FIG. 7 is an example of a schematic plan view of the wind instrument concerning claim 3 of the present invention.

FIG. 7 is also the schematic view of the wind instrument of claim 3 and shows the schematic view of the wind instrument where the sound range is expanded toward the high-pitched range and the passages are arranged both left and right sides sandwiching the main tube 10 having the mouthpiece 2. The channel switching mechanism 12 of the wind instrument shown in FIG. 7 is composed of two passage switching valves arranged on left and right sides sandwiching the mouthpiece 2. The two passage switching valves are interlockingly operated by operating the channel switching key 19 via the channel switching link mechanism 35. When the right passage switching valve is in the open state, the left passage switching valve is in the closed state. When the right passage switching valve is in the closed state, the left passage switching valve is in the open state. The high-pitched sound hole assembly 5, which is the expanded sound range, is arranged on the high-pitch branch tube 11 located at the left side of the mouthpiece 2. The low-pitched sound hole assembly 6, which is the existing sound range, is arranged on the low-pitch branch tube 36 located at the right side of the mouthpiece 2. The sound hole covers 4 of them are connected with each other by the predetermined sound interval interlocking mechanism 7. The flowing direction of the air entered from the mouthpiece 2 is switched by the operation of the channel switching key 19. Thus, the tube and the sound holes generating the standing wave are switched.

Figure 12A:
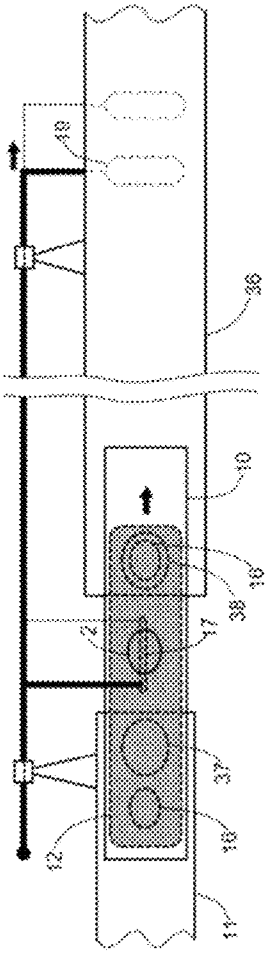
FIGS. 12A to 12C are a schematic plan view and a schematic front view of an example different from FIG. 7 of the wind instrument concerning claim 3 of the present invention.
Figure 12B:
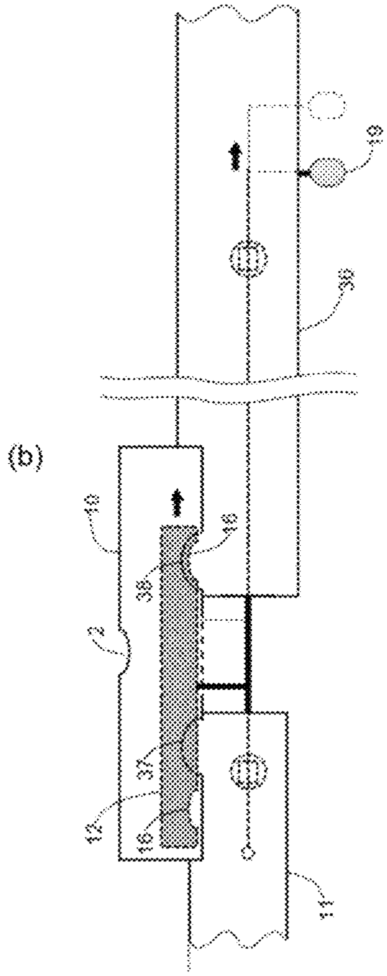
Figure 12C:
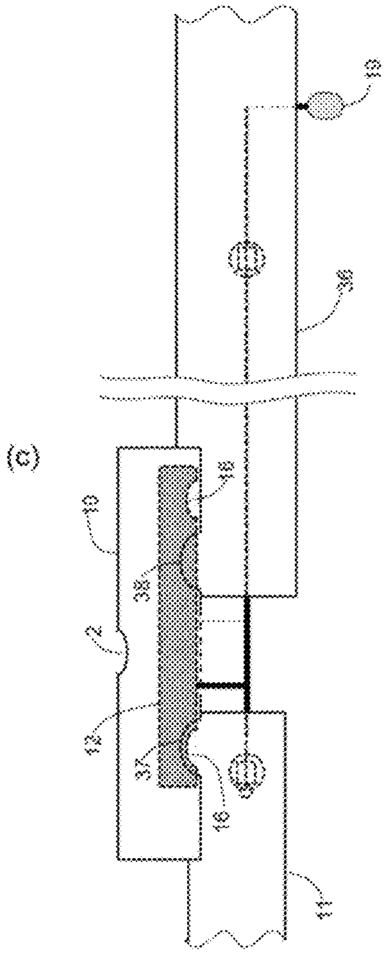

FIGS. 12A to 12C are the schematic views of the wind instrument where the sound range is expanded toward the high-pitched range and the passages are arranged both left and right sides sandwiching the main tube 10 having the mouthpiece 2 similar to the wind instrument shown in FIG. 7. FIG. 12A is a plan view, and FIGS. 12B and 12C are front views. In FIGS. 12A to 12C, only the main tube 10, the high-pitch branch tube 11, the low-pitch branch tube 36 and the channel switching mechanism 12 are shown omitting the sound holes 3, the sound hole covers 4 and the predetermined sound interval interlocking mechanisms 7. The difference from the wind instrument shown in FIG. 7 is the following point. Although the channel switching mechanism 12 of the wind instrument shown in FIG. 7 is composed of two passage switching valves, the wind instrument shown in FIGS. 12A to 12C is composed of the slide plate slidable along the inner surface of the main tube 10 in the longitudinal direction of the tube. The slide plate has two slide plate through holes 16. The main tube 10 and the high-pitch branch tube 11 are connected with each other so that the center axes of the tubes are eccentric to each other. Thus, the air entered in the main tube 10 flows in the high-pitch branch tube 11 through a high-pitch branch tube through hole 37. Similarly, the main tube 10 and the low-pitch branch tube 36 are connected with each other so that the center axes of the tubes are eccentric to each other. Thus, the air entered in the main tube 10 flows in the low-pitch branch tube 36 through a low-pitch branch tube through hole 38. As shown in FIG. 12B, when the slide plate is located at the position where one of the slide plate through holes 16 and the low-pitch branch tube through hole 38 are coincident with each other, the positons of the other of the slide plate through holes 16 and the high-pitch branch tube through hole 37 are not coincident with each other. Thus, the high-pitch branch tube through hole 37 is closed by the slide plate. On the contrary, as shown in FIG. 12C, when the slide plate is located at the position where one of the slide plate through holes 16 in two slide plate through holes 16 and the high-pitch branch tube through hole 37 are coincident with each other, the positons of the other of the slide plate through holes 16 and the low-pitch branch tube through hole 38 are not coincident with each other. Thus, the low-pitch branch tube through hole 38 is closed by the slide plate. By adopting the above described configuration, the player can switch the tube into which the breath entered in the main tube 10 flows by moving the slide plate in the longitudinal direction of the tube using the channel switching key 19. It is also possible to use the slide plate sliding in the circumferential direction of the tube, the slide plate sliding in the spiral direction or the slide plate sliding in a radial direction inside the tube.

The channel switching mechanism 12 is not limited to the configuration of opening only one passage. When a passage switching valve capable of selecting a plurality of passages to be opened is provided, the wind instrument can generate a chord in addition to a single-tone. Furthermore, the number of the passages is not limited to two. The wind instrument having three or more passages can be also provided.

Hereafter, four examples expanding the sound range by the present invention are shown in FIG. 8 to FIG. 11 using the example of the flute.

The sound hole covers 4 shown in FIG. 8 to FIG. 11 includes the sound hole covers drawn by thick line and the sound hole covers drawn by thin line. The former shows the sound hole covers 4 pressed by the fingers, while the latter shows the sound hole covers 4 opened and closed while being interlocked with the former. The arrow marks show the interlocking relation of them. When the sound hole cover 4 located at the first point of the arrow mark is pressed down, the sound hole cover 4 located at the head of the arrow mark is interlockingly pressed down. The black circle is added at the first point of the arrow mark for visually showing the sound hole cover 4 to be pressed. In addition, the symbols shown in the center of the sound hole covers 4 indicate the pitch of the fundamental standing wave generated from the sound hole 3 when the corresponding sound hole 3, which is opened and closed by the sound hole cover 4, is opened. Hereafter, the names of each of the sound holes 3 and each of the sound hole covers 4 are expressed by the name of the pitch. In addition, the arrow mark of the solid line indicates the predetermined sound interval interlocking mechanism 7, while the arrow mark of the broken line indicates an interlocking relation 20 of the sound hole covers in the conventional flute.

Figure 8:
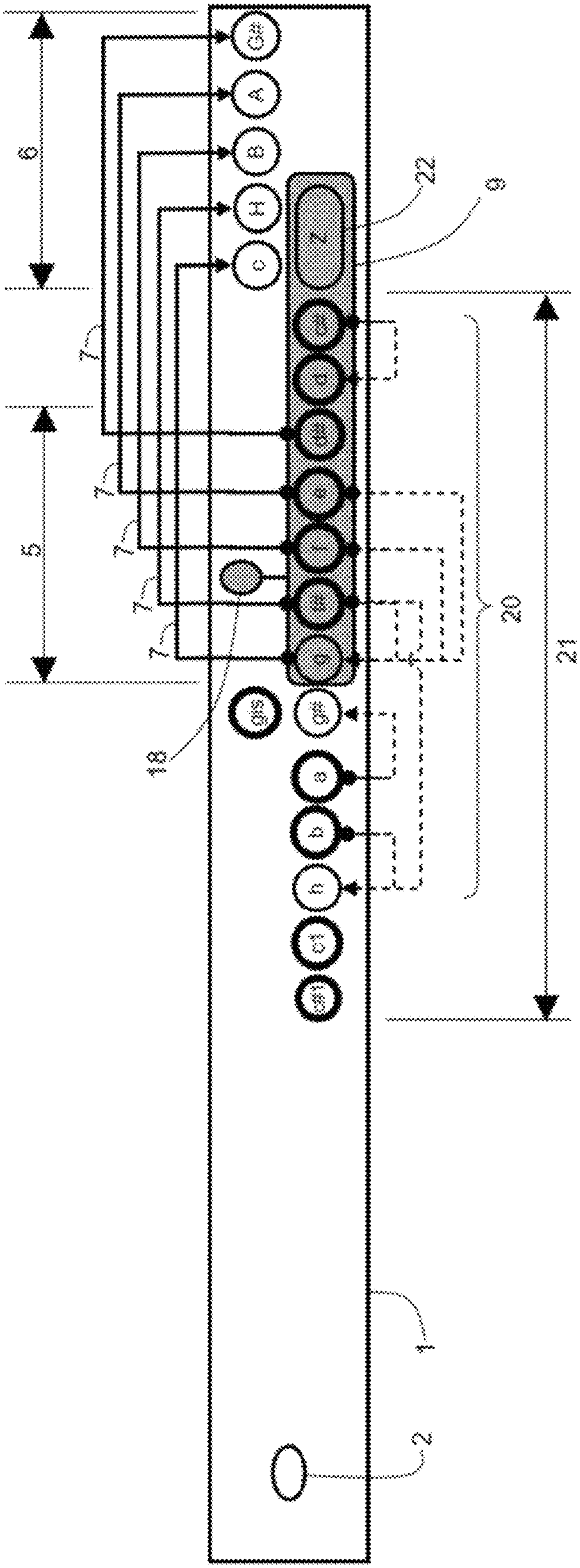
FIG. 8 is an interlocking relation diagram of the sound hole covers of the wind instrument where the low-pitched range is expanded with the range of perfect fourth and the range of perfect fourth is operated by the right hand.
Figure 9:
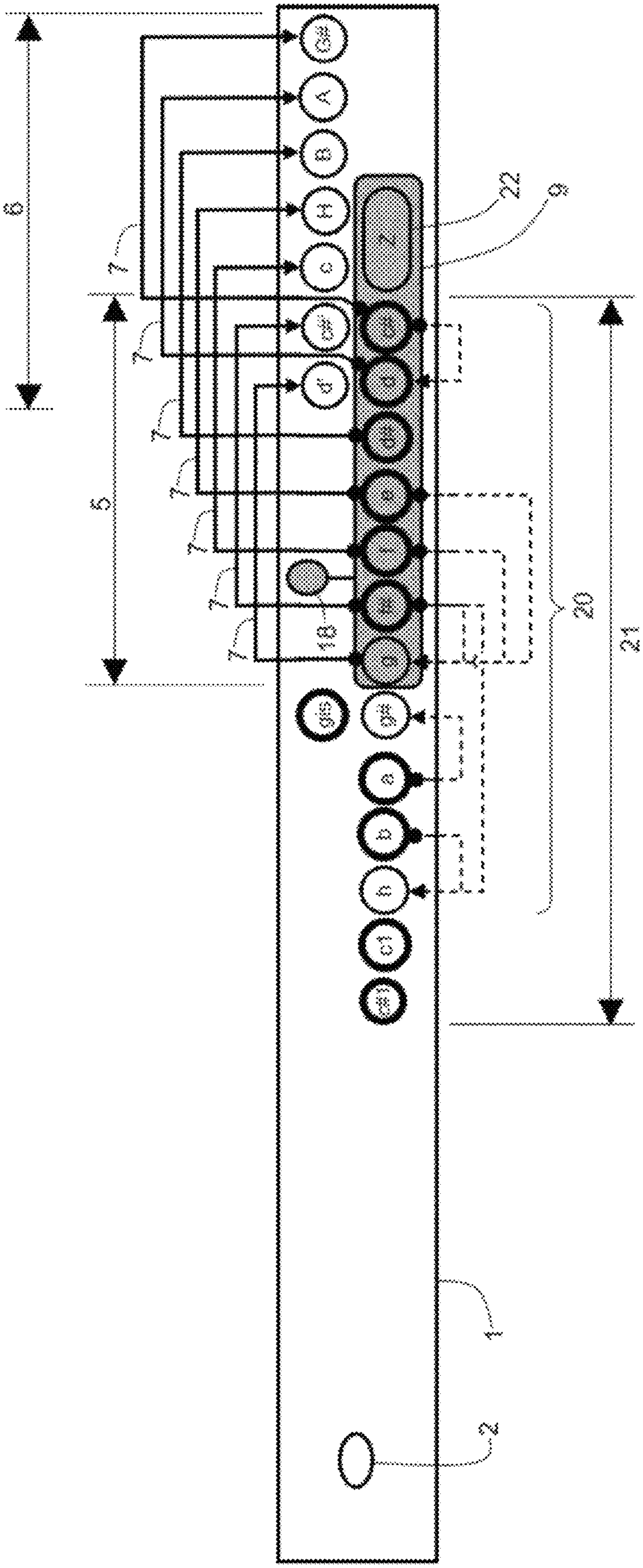
FIG. 9 is an interlocking relation diagram of the sound hole covers of the wind instrument where the low-pitched range is expanded with the range of perfect fourth and the range of perfect fifth is operated by the right hand.
Figure 10:
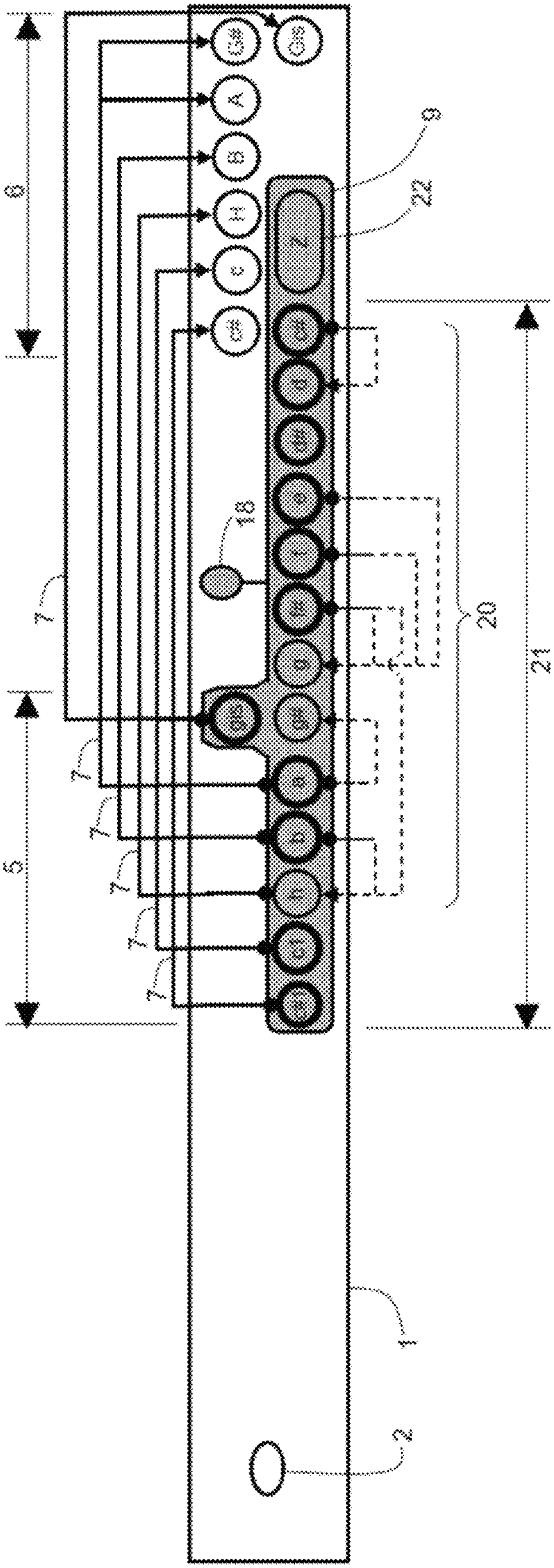
FIG. 10 is an interlocking relation diagram of the sound hole covers of the wind instrument where the low-pitched range is expanded with the range of perfect fourth and the range of perfect fourth is operated by the left hand.

Although the conventional flute includes the sound hole covers 4 generally called as D trill key and Dis trill key and operation levers for opening and closing these keys, these components are omitted in FIG. 8 to FIG. 10. This is because the above described two kinds of the sound hole covers 4 are not related to the present invention in the flute shown in FIG. 8 to FIG. 10. In the wind instrument shown in FIG. 11, it is possible to interlock the sound hole covers 4 of the existing sound range with the sound hole covers 4 of the expanded sound range by the predetermined sound interval interlocking mechanism 7 in each of the above described two kinds of the sound hole covers 4. However, the explanation is omitted since it is obvious that the above described configuration can be achieved by the same method as the predetermined sound interval interlocking mechanism 7 shown in FIG. 11.

FIG. 8 shows an example where the low-pitched sound hole assembly 6 is added to the sound hole row 21 of the conventional flute for expanding the sound range toward the low-pitched range with the range of perfect fourth. The pitch sound interval between two sound holes 3 interlocked by the predetermined sound interval interlocking mechanism 7 is perfect fifth. Here, the high-pitched sound hole assembly 5 of the existing sound range is composed of the sound holes 3 of g, f #, f, e and d #. The low-pitched sound hole assembly 6 of the expanded sound range is composed of the sound holes 3 of c, H, B, A and G #. Each of the sound hole covers 4 of the above described two sound ranges is interlocked by five predetermined sound interval interlocking mechanisms 7. When the player generates the sound of the existing sound range, the slide plate 9 is arranged on the position of opening the sound holes 3 of the high-pitched sound hole assembly 5 using the slide plate operation key 18 and the sound hole covers 4 of the high-pitched sound hole assembly 5 are operated. When the player generates the sound of the expanded sound range, the slide plate 9 is arranged on the position of closing the sound holes 3 of the high-pitched sound hole assembly 5 using the slide plate operation key 18 and the sound hole covers 4 of the high-pitched sound hole assembly 5 are operated. Namely, the player can play both the existing sound range and the expanded sound range by selecting the playing sound range using the slide plate operation key 18 and only by the operation of the sound hole covers 4 of the high-pitched sound hole assembly 5.

Note that the sound hole covers 4 of d and c #are not the sound hole covers 4 of the high-pitched sound hole assembly 5 and not the sound hole covers 4 of the low-pitched sound hole assembly 6. These are the sound hole covers 4 existing in the conventional flute. When the slide plate 9 is located at the position of opening the sound hole covers 4 of the high-pitched sound hole assembly 5, if the player performs the fingering for c, which is the lowest sound in the conventional flute, by closing all of the sound hole covers 4 of g, f #, f, e, d #, d and c #, the tone of G is unintentionally generated since the sound hole covers of c, H, B, A and G #are also closed although the intention of the player is to generate the tone of c. A full-close preventing hole 22 is the sound hole for avoiding the above described unintentional full close state. The full-close preventing hole 22 shown in FIG. 8 is the example of the hole formed in a large elliptic shape. The similar effect can be obtained even when a plurality of small holes is arranged. The three sound holes 3 (i.e., sound holes 3 of d, c #and full-close preventing hole 22) are opened and closed by the slide plate 9 although they are not the sound holes 3 of the high-pitched sound hole assembly 5.

FIG. 9 shows the example where the low-pitched sound hole assembly 6 is added to the sound hole row 21 of the conventional flute to expand the sound range toward the low-pitched range with the range of perfect fourth similar to FIG. 8. FIG. 9 is different from FIG. 8 in the points that pitch sound interval between two sound holes 3 interlocked by the predetermined sound interval interlocking mechanism 7 is perfect fourth, the high-pitched sound hole assembly 5 which is the existing sound range is composed of seven sound holes 3 by adding two sound holes 3 of d and c #and the low-pitched sound hole assembly 6 which is the expanded sound range is composed of seven sound holes 3 by adding two sound holes 3 of d' and c #'. Consequently, compared to FIG. 8, the sound range playable by the sound hole covers 4 of the existing sound range of the high-pitched sound hole assembly 5 is expanded by the major second. As shown in FIG. 9, the sound holes 3 of d and c #which are a part of the high-pitched sound hole assembly 5 and the sound holes 3 of d' and c #' which are a part of the low-pitched sound hole assembly 6 cannot be the same sound hole. However, the tone and the sound range generated by each of the sound holes can be overwrapped with each other.

FIG. 10 also shows the example where the low-pitched sound hole assembly 6 is added to the sound hole row 21 of the conventional flute to expand the sound range toward the low-pitched range with the range of perfect fourth. The sound interval between two sound holes 3 interlocked by the predetermined sound interval interlocking mechanism 7 is perfect eighth. The sound holes 3 of the high-pitched sound hole assembly 5 shown in FIG. 10 are six of c #1, c1, h, b, a and gis, while the sound holes 3 of the low-pitched sound hole assembly 6 are six of c #, c, H, B, A and Gis. The sound hole cover 4 of a of the high-pitched sound hole assembly 5 is interlocked with two sound hole covers 4 of A and G # of the expanded sound range, but the sound hole of G #is not included in the low-pitched sound hole assembly 6. This is because the predetermined sound interval interlocking mechanism does not exist between the sound hole 3 of G #and the sound hole 3 of g #which has the sound interval of perfect eighth from G #although the sound interval between two sound holes 3 interlocked by the predetermined sound interval interlocking mechanism 7 is perfect eighth in the flute shown in FIG. 10. As described above, it is necessary to provide two sound hole covers having a predetermined sound interval and interlocked by the predetermined sound interval interlocking mechanism 7. However, it is also possible that the predetermined sound interval interlocking mechanism 7 has a mechanism for interlocking the opening and closing operation of the other sound hole covers.

Figure 11:
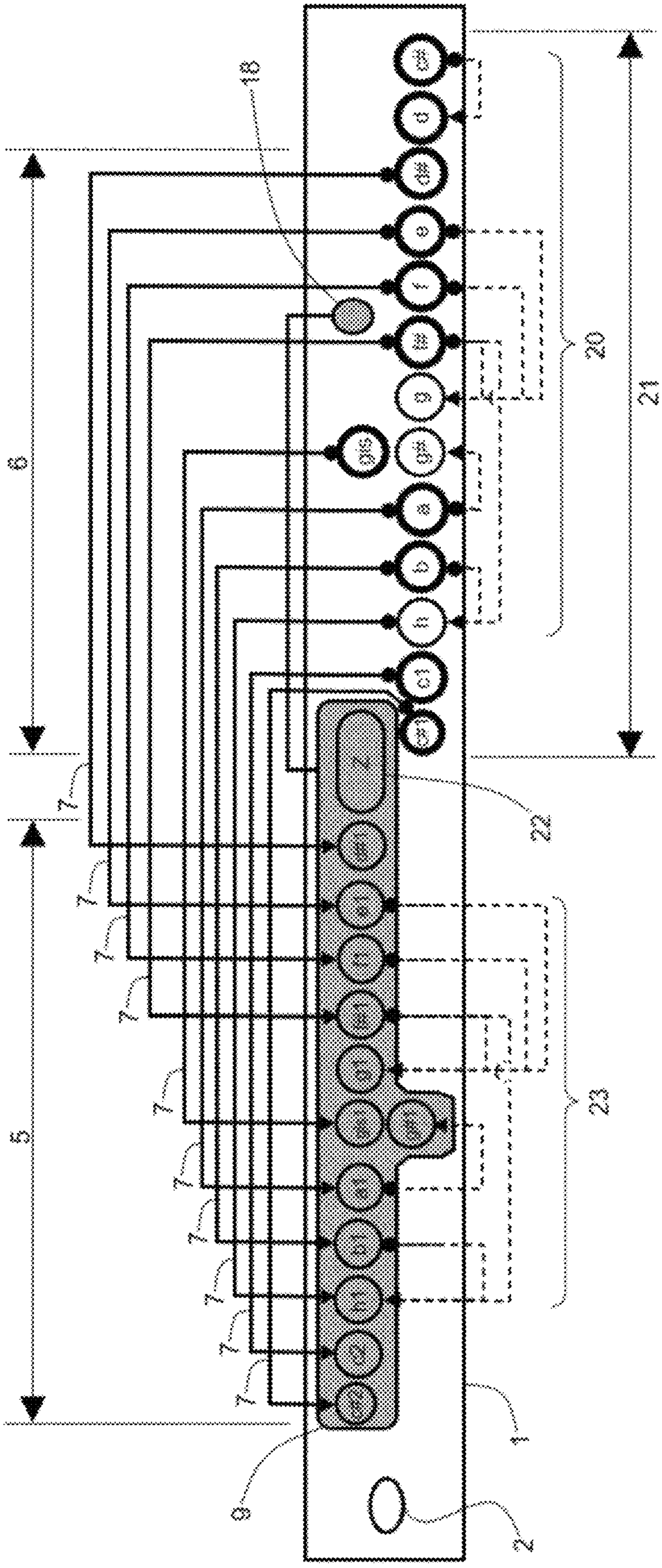
FIG. 11 is an interlocking relation diagram of the sound hole covers of the wind instrument where the high-pitched range is expanded with the range of perfect eighth and the range of major seventh is operated by both hands.

FIG. 11 is the example where the sound holes 3 are added to the sound hole row 21 of the conventional flute toward the high-pitched range to expand the sound range with perfect eighth. The sound interval between two sound holes 3 interlocked by the predetermined sound interval interlocking mechanism 7 is perfect eighth. In FIG. 11, the low-pitched sound hole assembly 6 of the existing sound range is composed of the sound holes 3 of c #1, c1, h, b, a, gis, f #, f, e and d #. Here, since the sound holes 3 of g #and g are not connected to the predetermined sound interval interlocking mechanism 7, these are not included in the sound holes 3 of the low-pitched sound hole assembly 6. In addition, the high-pitched sound hole assembly 5 of the expanded sound range is composed of the sound holes 3 of c #2, c2, h1, b1, a1, gis1, f #1, f1, e1 and d #1. Also here, since the sound holes 3 of g #1 and g1 are not connected to the predetermined sound interval interlocking mechanism 7, these are not included in the sound holes 3 of the high-pitched sound hole assembly 5. In FIG. 11, broken line arrows shown below the sound holes 3 of the high-pitched sound hole assembly 5 show interlocking relations 23 between the sound hole covers of the high-pitched sound hole assembly 5 which is the expanded sound range. As described above, it is possible to provide a mechanism for interlocking between the pluralities of sound holes 3 of the expanded sound range. It is not necessary that the assembly of the sound holes 3 of the high-pitched sound hole assembly 5 constitutes all sounds continuously including half-tones without gaps as shown in FIG. 11. This can be the same for the low-pitched sound hole assembly 6.

Four flutes to which the present invention is applied are shown in FIG. 8 to FIG. 11. The present invention can be applied widely to the wind instruments, both a vertical wind instrument and a transverse wind instrument. In addition, the present invention does not depend on the principle of sound production. Thus, the present invention can be applied to the flute family, the recorder family, the reed instrument and the like.

In the present invention, one finger is used for operating the slide plate operation key 18, the high-pitch range connector operation key 33 or the channel switching key 19. Since the thumb of the right hand is used only for supporting the tube 1 and not used for the opening and closing operation of the sound hole covers 4 in the whistle such as the recorder and the flute, the thumb of the right hand can be assigned to the above described operation. Thus, the operations of the sound hole covers 4 by the other fingers are not affected. The role of supporting the tube 1 can be substituted by providing a lever or a ring fixed to the tube 1 and the lever or the ring is supported by a finger joint of the thumb of the right hand or surrounding portions although the tube 1 is conventionally supported by the thumb of the right hand. Needless to say, the finger of operating the slide plate operation key 18, the high-pitch range connector operation key 33 or the channel switching key 19 is not limited to the above described thumb of the right hand. The above described keys are not necessarily new keys shown in the examples of the flute and the recorder shown in FIG. 1A to FIG. 12C which are not provided with the conventional wind instrument. It is also possible to provide a mechanism of interrupting the sound generation from the high-pitched sound hole assembly 5 as an interlocking mechanism added to the conventionally existing sound hole covers 4 or conventionally existing key/lever. For example, the operation of opening and closing the sound hole cover 4 of the sound hole 3 for generating the sound of d in the conventional flute is operated by the little finger of the right hand. Thus, it is possible to provide a mechanism of closing the sound hole 3 of the high-pitched sound hole assembly 5 so that the slide plate 9 is moved interlockingly with the operation of the above described sound hole cover 4.

It is also possible to apply the present invention and provide the wind instrument having the predetermined sound interval interlocking mechanism 7 for interlocking three or more sound hole covers 4 between two or more predetermined sound intervals. For example, it is possible to provide the flute for interlocking four sound hole covers 4 so that the sound intervals of the sound holes 3 between the first and second holes, between the second and the third holes and between the third and the fourth holes are constant in a plurality of predetermined sound interval interlocking mechanisms. In the above described flute, three high-pitched range sound hole assemblies 5 are provided and the number of the switching patterns of the sound holes 3 switched by the sound hole switching mechanism is four. In the above described flute, it is possible to have the sound range of exceeding four octaves. It is also possible to provide the flute having the sound range of three octaves same as the conventional flute only by the operation of one hand when the predetermined sound interval is set to perfect fourth.

As described above, the wind instrument of the present invention includes the high-pitched sound hole assembly 5 which is an assembly of the sound holes located at the higher-pitched range in the sound holes opened and closed while being interlocked by the predetermined sound interval interlocking mechanism 7; the low-pitched sound hole assembly 6 which is an assembly of the sound holes located at the lower-pitched range in the sound holes opened and closed while being interlocked by the predetermined sound interval interlocking mechanism 7; and the sound hole switching mechanism configured to collectively stop generating sound from the sound holes of all of the high-pitched sound hole assembly 5 by one key operation without depending on a state of an interlocking operation of the sound hole covers and without affecting the opening and closing operations of the sound hole covers of the low-pitched sound hole assembly 6, the operation of the sound hole switching mechanism being given priority over the interlocking operation of the sound hole covers operated by the predetermined sound interval interlocking mechanism 7. By using the above described configurations, when the low-pitched range is played, even if the interlocking operation of opening and closing the sound hole covers 4 of the high-pitched sound hole assembly 5 interlocked by the predetermined sound interval interlocking mechanism 7 is the operation of opening the sound holes 3, it is possible to stop generating sound from these sound holes 3. Thus, the sound is not generated from the high-pitched range. As a result, the playable sound range can be expanded significantly only by operating the sound hole covers of the existing sound range without increasing the number of the sound hole covers operated by each finger during the playing. In addition, both the low-pitched range and the high-pitched range can be played only by the operation of selecting the sound range and operating the sound hole covers 4 of the existing sound range. Thus, new operation keys for the expanded sound range are not required to be added and a rapid passage can be played in the expanded sound range by the existing operation keys. Furthermore, in the wind instrument of the present invention, the fingering of the expanded sound range is similar to the fingering of the existing sound range. Thus, it is easy for the player to learn the playing technique of the expanded sound range. For example, in the flute shown in FIG. 8, the fingering from g to d in the existing sound range is same as the fingering from c to G in the expanded sound range. As described above, the present invention has remarkable effects compared to the conventional technology shown in Patent Document 1 in the expandability of the playable sound range, easiness for playing the expanded sound range and easiness for learning playing technique.

INDUSTRIAL APPLICABILITY

The present invention can provide the wind instrument having the sound range wider than that of the conventional wind instrument. Thus, freedom of musical expression is expanded for the player. In addition, a rapid passage can be played in the expanded sound range by the fingering easier than the conventional technology. In addition, the instrument capable of being operated by one hand and having the sound range similar to the instrument operated by both hands can be provided. From the above, the manufactures of musical instruments can provide the instrument more attractive for the players.

DESCRIPTION OF THE REFERENCE NUMERALS

1: tube, 2: mouthpiece, 3: sound holes, 4: sound hole cover, 5: high-pitched sound hole assembly, 6: low-pitched sound hole assembly, 7: predetermined sound interval interlocking mechanism, 9: slide plate, 10: main tube, 11: high-pitch branch tube, 12: channel switching mechanism, 13: sound hole cover interlocking cylinder, 14: sound hole cover connecting arm, 15: sound hole cover rotating shaft, 16: slide plate through hole, 17: slit hole, 18: slide plate operation key, 19: channel switching key, 20: interlocking relation in sound hole cover of sound range of conventional flute, 21: sound hole row of conventional flute, 22: full-close preventing hole, 23: interlocking relation in sound hole cover of expanded sound range, 24: pressing protrusion, 25: sound hole cover pressing key, 26: predetermined sound interval interlocking mechanism arm, 27: press receiving projection, 28: passage intercepting wall located at position of intercepting high-pitch branch tube, 29: passage intercepting wall located at position of intercepting low-pitch branch tube, 30: high-pitch range connector rotation axis, 31: high-pitch range connector cylinder, 32: high-pitch range connector arm, 33: high-pitch range connector operation key, 34: window, 35: channel switching link mechanism, 36: low-pitch branch tube, 37: high-pitch branch tube through hole, 38: low-pitch branch tube through hole

The invention claimed is:

1. A wind instrument, comprising:

a tube;

a mouthpiece provided on the tube;

a plurality of sound holes provided on the tube;

sound hole covers, each of the sound hole covers being configured to open and close each of the sound holes;

a plurality of predetermined sound interval interlocking mechanisms, each of the predetermined sound interval interlocking mechanism being configured to open and close one of two sound hole covers which generate two tones having a predetermined sound interval interlockingly with the other of the two sound hole covers;

a high-pitched sound hole assembly which is an assembly of the sound holes, each of said sound hole is located at a higher-pitched range in two of the sound holes opened and closed while being interlocked by the predetermined sound interval interlocking mechanism;

a low-pitched sound hole assembly which is an assembly of the sound holes, each of said sound hole is located at a lower-pitched range in two of the sound holes opened and closed while being interlocked by the predetermined sound interval interlocking mechanism; and a high-pitched sound hole closing mechanism configured to collectively stop generating sound from all of the sound holes of the high-pitched sound hole assembly by one key operation without affecting the opening and closing of the sound hole covers of the low-pitched sound hole assembly without depending on a state of an interlocking operation of the sound hole covers operated by the predetermined sound interval interlocking mechanism.

2. The wind instrument according to claim 1, wherein a slide plate is provided as the high-pitched sound hole closing mechanism, and the slide plate is configured to slide along an inner surface of the tube in a circumferential direction, slide along the inner surface of the tube in a longitudinal direction, slide along the inner surface of the tube in a spiral direction, or slide inside the tube in a radial direction.

3. The wind instrument according to claim 1, wherein a channel switching mechanism is provided as the high-pitched sound hole closing mechanism, the tube includes a main tube, a high-pitch branch tube branched from the main tube and a low-pitch branch tube branched from the main tube, the sound holes of the high-pitched sound hole assembly are arranged on the high-pitch branch tube, the sound holes of the low-pitched sound hole assembly are arranged on the low-pitch branch tube, the channel switching mechanism is arranged on a position where the main tube is branched to the high-pitch branch tube and the low-pitch branch tube, and the channel switching mechanism is configured to switch a passage of breath entered from the main tube between the high-pitch branch tube and the low-pitch branch tube.

* * * * *